(12) United States Patent
Malkamäki et al.

(10) Patent No.: US 12,349,042 B2
(45) Date of Patent: Jul. 1, 2025

(54) ADDRESS ASSIGNMENT

(71) Applicant: NOKIA TECHNOLOGIES OY, Espoo (FI)

(72) Inventors: Esa Mikael Malkamäki, Espoo (FI); Matti Einari Laitila, Oulu (FI); Dawid Koziol, Glogow (PL)

(73) Assignee: NOKIA TECHNOLOGIES OY, Espoo (FI)

( * ) Notice: Subject to any disclaimer, the term of this patent is extended or adjusted under 35 U.S.C. 154(b) by 913 days.

(21) Appl. No.: 17/608,055

(22) PCT Filed: May 13, 2019

(86) PCT No.: PCT/EP2019/062159
§ 371 (c)(1),
(2) Date: Nov. 1, 2021

(87) PCT Pub. No.: WO2020/228937
PCT Pub. Date: Nov. 19, 2020

(65) Prior Publication Data
US 2022/0225207 A1  Jul. 14, 2022

(51) Int. Cl.
*H04W 40/24* (2009.01)
*H04W 8/26* (2009.01)
*H04W 80/02* (2009.01)

(52) U.S. Cl.
CPC .......... *H04W 40/248* (2013.01); *H04W 8/26* (2013.01); *H04W 80/02* (2013.01)

(58) Field of Classification Search
None
See application file for complete search history.

(56) References Cited

U.S. PATENT DOCUMENTS

| | | | |
|---|---|---|---|
| 2010/0103845 A1 | 4/2010 | Ulupinar et al. | |
| 2014/0348061 A1* | 11/2014 | Salkintzis | H04L 65/4038 370/328 |
| 2021/0168115 A1* | 6/2021 | de la Oliva | H04W 12/06 |

OTHER PUBLICATIONS

International Search Report and Written Opinion dated Sep. 11, 2019 corresponding to International Patent Application No. PCT/EP2019/062159.
3GPP TS 22.261 V16.6.0 (Dec. 2018), Technical Specification, 3rd Generation Partnership Project; Technical Specification Group Services and System Aspects; Service requirements for the 5G system; Stage 1 (Release 16), Dec. 2018.
3GPP TR 38.874 V1.0.0 (Dec. 2018), Technical Report, 3rd Generation Partnership Project; Technical Specification Group Radio Access Network; Study on Integrated Access and Backhaul (Release 15), Dec. 2018.

(Continued)

*Primary Examiner* — Robert M Morlan
(74) *Attorney, Agent, or Firm* — Robert P. Michal, Esq.; Carter, DeLuca & Farrell LLP

(57) ABSTRACT

It is provided a method, comprising monitoring if an assignment packet is received by a new node from a parent node; setting, if the assignment packet is received, a new value of an identifier for determining if a first packet of a first layer protocol is intended for the new node; wherein the assignment packet comprises the new value of the identifier; the assignment packet is a packet of the first layer protocol; the assignment packet comprises a header of the first layer protocol.

1 Claim, 6 Drawing Sheets

(56) References Cited

OTHER PUBLICATIONS

Ericsson, "IP Address Assignment for IAB Nodes," 3GPP Draft; R2-1901383, 3GPP TSG-RAN WG2 #105, Athens, Greece, Feb. 14, 2019, XP051602742.
Ericsson, "IAB Node Integration Procedure," 3GPP Draft; R2-1907010, 3GPP TSG-RAN WG2 Meeting #106, Reno, NV, USA, May 2, 2019, XP051711307.
Huawei et al., "Routing function and configuration," 3GPP Draft; R2-1906064, 3GPP TSG-RAN WG2 meeting #106, Reno, USA, May 3, 2019, XP051710391.
Huawei, "IAB Node Integration Procedure," 3GPP Draft; R3-191834, 3GPP TSG-RAN WG3 Meeting #103bis, Xi'an, China, Apr. 6, 2019, XP051703105.
Nokia et al., "Adaptation layer modelling and configuration," 3GPP Draft; R2-1904409, 3GPP TSG-RAN WG2 Meeting #105bis, Xian, China, Apr. 8-12, 2019.
Qualcomm, "New WID: Integrated Access and Backhaul for NR," RP-182882, 3GPP TSG RAN Meeting #82, Sorrento, Italy, Dec. 10-13, 2018.
Communication pursuant to Article 94(3) EPC dated Jan. 19, 2023, corresponding to European Patent Application No. 19726321.3.

* cited by examiner

ADDRESS ASSIGNMENT

FIELD OF THE INVENTION

The present invention relates to address assignment. In a particular case, it relates to assigning an address of BAP or F1AP to a newly added IAB node.

Abbreviations

3GPP 3$^{rd}$ Generation Partnership Project
3G/4G/5G 3$^{rd}$/4$^{th}$/5$^{th}$ Generation
addr Address
BAP Backhaul Adaptation Protocol
BH Backhaul
ch Channel
CP Control Plane
CU Central Unit
DgNB Donor gNB
DL Downlink
DU Distributed Unit
F1 Interface between CU and DU
F1AP F1 Application Protocol
F1-C F1 Control Plane
gNB gNodeB (base station of 5G)
GPRS General Packet Radio Service
GTP GPRS Tunneling Protocol
GTP-U GTP—User Plane
IAB Integrated Access and Backhaul
ICMP Internet Control Message Protocol
IP Internet Protocol
L1/L2/L3 Layer 1 (=PHY)/Layer 2 (=MAC)/Layer 3 (=Transport)
MAC Medium Access Control
MT Mobile Termination
NG Next Generation
NGC Next Generation Core
NR New Radio
PDCP Packet Data Convergence Protocol
PDU Protocol Data Unit
PHY Physical Layer
RAN Radio Access Network
RLC Radio Link Control
RRC Radio Resource Control
SA System Architecture
SCTP Stream Control Transmission Protocol
SDAP Service Data Adaptation Protocol
SRB Signalling Radio Bearer
TS Technical Specification
UDP User Datagram Protocol
UE User Equipment
UL Uplink
UP User Plane

BACKGROUND OF THE INVENTION

The 5G NR shall be able to allow network deployment with minimized manual efforts and as automated self-configuration as possible. Especially on higher frequency bands the coverage will be an issue and specific capabilities are needed for NR to enable easy coverage extension with minimized/none requirements for network (re-)planning in a fast and cost-efficient manner. Mainly for these reasons, NR has the requirement to support wireless backhaul to connect relay nodes (also called Integrated Access and Backhaul, IAB nodes) with each other and to base stations with a fixed (wired or wireless) backhaul connection. "Fixed" means that the backhaul connection is independent from the radio access resources. More specifically, NR needs to support self-backhauling where the same carrier is used for backhaul connection as well as for the access links, i.e., enabling in-band backhaul operation.

SA1 has defined general requirements for wireless self-backhauling in 3GPP TS 22.261, Service requirement for the 5G System, section 6.12.2. IAB was studied in 3GPP during 2018, the outcome was a study item technical report 3GPP TR 38.874. New Work Item RP-182882 was started this year and IAB is now being standardised.

A specific IAB-node will have a wireless backhaul connection (instead of having a wired connection) to a Donor gNB (DgNB), a base station with fixed connection to the network backhaul. The serving DgNBs will have the overall control of the usage of the radio resources considering both access and backhaul links.

FIG. 1 shows schematically an Integrated Access and Backhaul tree including connections between IAB-nodes and Donor gNB. The indicated links use radio resources of the DgNB generally assigned to the radio access by DgNB.

The network architecture of IAB is agreed to be according to FIG. 2. The IAB-node hosts a MT part and a DU part. MT part has UE functionality and connects to the parent node DU. The parent node can be either DgNB or another IAB-node. Backhaul RLC channel(s) are setup between the MT part of the IAB node and the parent node's DU part. Adaptation layer (or Backhaul Adaptation Protocol (BAP) layer) is agreed to be on top of the RLC layer. DU part of each IAB node connects to DgNB CU with F1 interface which is enhanced to support IAB functions. F1 packets (GTP-U/UDP/IP for UP and F1AP/SCTP/IP for CP) are transported on top of the adaptation layer. IAB thus implements L2 relaying. F1* just means F1 interface enhanced to support IAB functions, and F1-U* denotes its user part. An IAB node may be connected to more than one (e.g. two) parent nodes.

An IAB node represents a co-located resource providing NR access coverage and backhauling over the air interface. As such, an IAB node may take on both the personality of UE (MT part) for transferring backhaul traffic or that of gNB (or gNB-DU) serving connected UEs and forwarding backhaul traffic to the next IAB node.

Like a wired node, IAB node may serve one or more cells in a sectorized site, e.g. with 3 sectors per site for hexagonal layout and 4 cells per site for an urban grid. Each cell (sector) may be configured independently being used for access or backhaul in concurrent slots.

Traffic may be forwarded internally within an IAB node being received in one cell and transmitted in another cell, provided by the same or different IAB node or by the DgNB, on one or more of subsequent slots.

IAB network consists of a tree where the IAB-donor is the root and IAB-nodes connect to it and other IAB-nodes (see FIG. 1). An adaptation layer supports mapping of UE bearer (i.e. access bearer) to backhaul RLC channel and/or routing in the IAB tree. It has been agreed that routing in the IAB tree uses adaptation layer addresses, either destination addresses (IAB-node (DL) or IAB-donor CU or DU address (UL)) or path identifiers. The "adaptation layer" is officially named Backhaul Adaptation Protocol (BAP).

It has been proposed to have only one adaptation layer entity in an IAB-node and furthermore, it has been proposed to configure that adaptation layer entity by using F1AP signalling [see Tdoc R2-1904409]. As an alternative solution it was proposed to have two adaptation layer entities in the IAB-node and configure the DU side adaptation layer with F1AP and the MT side adaption layer with RRC signalling. Having a single adaption layer entity configured by F1AP signalling has the advantage of limiting the impacts on UE/MT part of the IAB node.

SUMMARY OF THE INVENTION

It is an object of the present invention to improve the prior art.

According to a first aspect of the invention, there is provided an apparatus, comprising means for monitoring configured to monitor if an assignment packet is received by a new node from a parent node; means for setting configured to set, if the assignment packet is received, a new value of an identifier for determining if a first packet of a first layer protocol is intended for the new node; wherein the assignment packet comprises the new value of the identifier; the assignment packet is a packet of the first layer protocol; the assignment packet comprises a header of the first layer protocol.

According to a second aspect of the invention, there is provided an apparatus, comprising means for instructing configured to instruct a parent node to provide an assignment packet to a new node, wherein the assignment packet comprises a new value of an identifier; the assignment packet is a packet of a first layer protocol; the assignment packet comprises a header of the first layer protocol; and the new value of the identifier is for routing a first packet of the first layer protocol to the new node. According to a third aspect of the invention, there is provided a method, comprising monitoring if an assignment packet is received by a new node from a parent node; setting, if the assignment packet is received, a new value of an identifier for determining if a first packet of a first layer protocol is intended for the new node; wherein the assignment packet comprises the new value of the identifier; the assignment packet is a packet of the first layer protocol; the assignment packet comprises a header of the first layer protocol.

According to a fourth aspect of the invention, there is provided a method, comprising instructing a parent node to provide an assignment packet to a new node, wherein the assignment packet comprises a new value of an identifier; the assignment packet is a packet of a first layer protocol; the assignment packet comprises a header of the first layer protocol; and the new value of the identifier is for routing a first packet of the first layer protocol to the new node.

According to a fifth aspect of the invention, there is provided a computer program product comprising a set of instructions which, when executed on an apparatus, is configured to cause the apparatus to carry out the method according to any of the third and fourth aspects.

According to some example embodiments of the invention, at least one of the following advantages may be achieved:
- a single adaptation layer may be used for DU and MT in donor gNB, intermediate IAB node, and the last IAB node of a tree (or any other topology such as a mesh or a star or a directed acyclic graph);
- no need to modify RRC or F1AP signalling to provide the IAB-node address to a new IAB-node:
  - relying on F1AP signalling for IAB node address delivery might be problematic, since F1AP is carried over adaptation layer while adaptation layer PDU normally needs to contain routing identifier;
  - using RRC signalling would require a part of adaptation layer configuration to be delivered with MT-specific signalling while it is preferential to keep the impacts on UE/MT part of the IAB node related to network signalling to a necessary minimum and implement the adaptation layer and routing functionality in the IAB-node's DU part. Delivering IAB node address via RRC signalling would also require this information to be passed with an internal interface between MT and IAB-node DU, which has additional impact on implementation.

IAB-node address can be used for routing before the F1 is set up.

Further advantages become apparent from the following detailed description.

It is to be understood that any of the above modifications can be applied singly or in combination to the respective aspects to which they refer, unless they are explicitly stated as excluding alternatives.

BRIEF DESCRIPTION OF THE DRAWINGS

Further details, features, objects, and advantages are apparent from the following detailed description of the preferred example embodiments of the present invention which is to be taken in conjunction with the appended drawings, wherein.

DETAILED DESCRIPTION OF CERTAIN EXAMPLE EMBODIMENTS

Herein below, certain example embodiments of the present invention are described in detail with reference to the accompanying drawings, wherein the features of the example embodiments can be freely combined with each other unless otherwise described. However, it is to be expressly understood that the description of certain example embodiments is given by way of example only, and that it is by no way intended to be understood as limiting the invention to the disclosed details.

Moreover, it is to be understood that the apparatus is configured to perform the corresponding method, although in some cases only the apparatus or only the method are described.

Some example embodiments of this invention are related to Integrated Access and Backhaul (IAB) and especially on the configuration of adaptation layer in the IAB-node. It provides the assignment of the destination address to a new IAB-node connecting to the IAB tree (or any other topology such as a mesh or a star or a directed acyclic graph).

Figure 1:
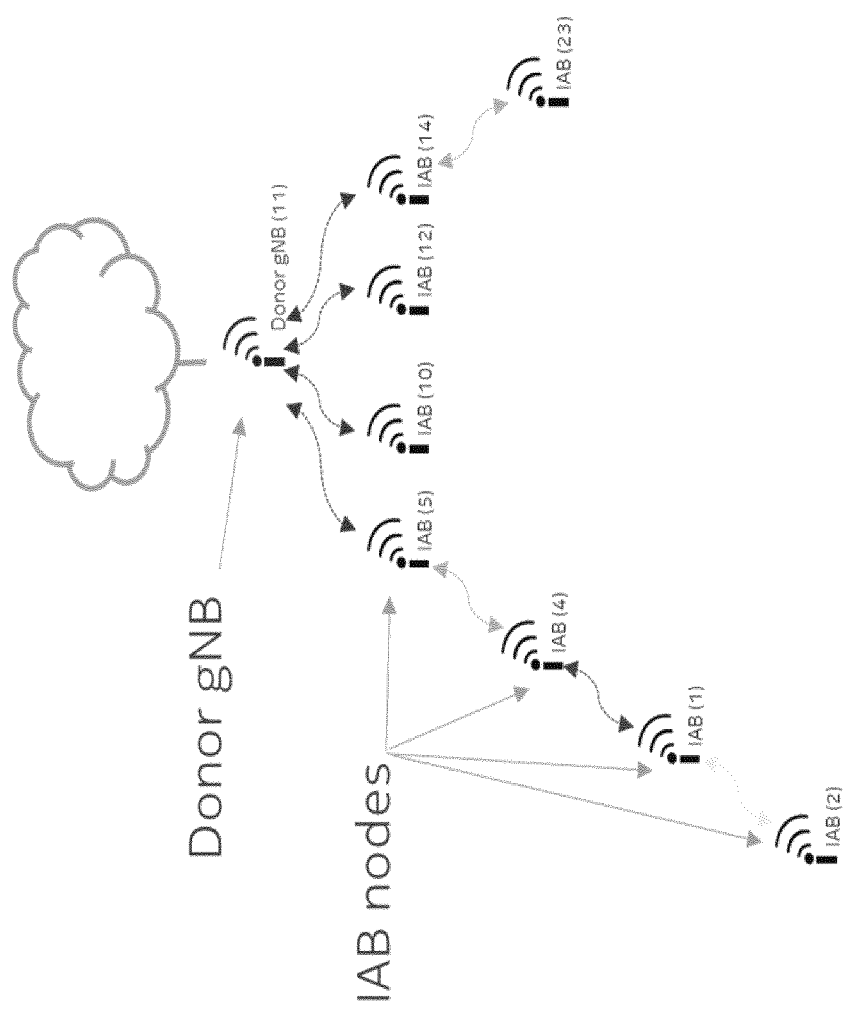
FIG. 1 shows schematically an Integrated Access and Backhaul tree.
Figure 2:
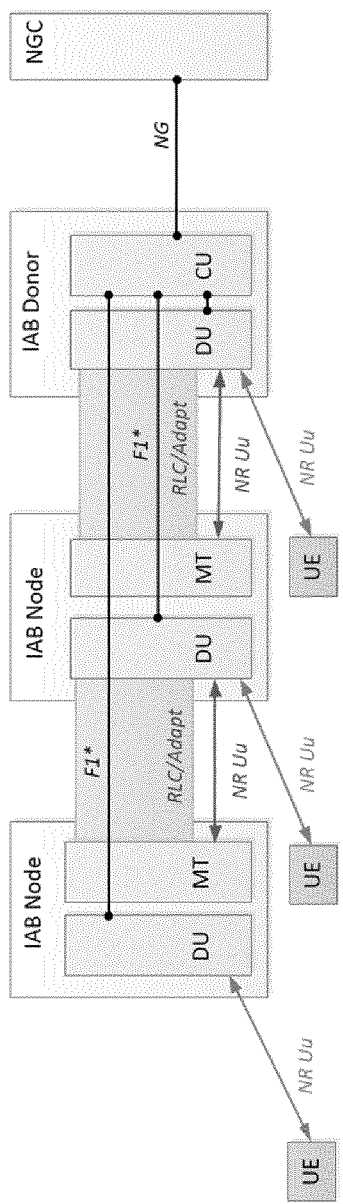
FIG. 2 shows the agreed network architecture of IAB.
Figure 3:
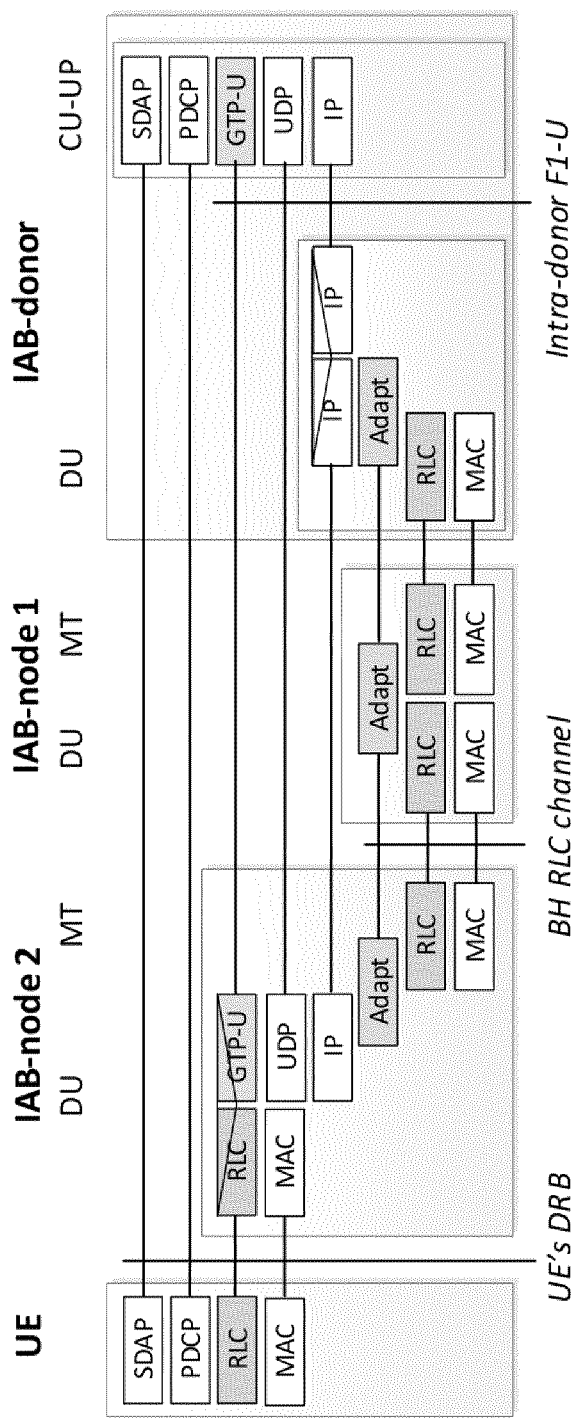
FIG. 3 shows the modelling of BAP (adaptation layer)

FIG. 3 shows the modelling of BAP (adaptation layer) in IAB-nodes and IAB-donor DU with a single BAP (adaptation layer) entity per IAB node/IAB-donor. It can be seen as a functionality between the IAB-node DU and MT performing routing and (access) bearer to BH RLC channel mapping. Here we assume that BAP entity is configured by F1AP signalling and, thus, BAP entity may be considered as part of the DU.

If there is only one adaptation layer entity in an IAB-node and the adaptation layer entity is configured by using F1AP signalling, when a new IAB node is setup (i.e., it connects to an IAB-donor DU (of the DgNB) or to another IAB-node), F1 connection is not yet setup and thus F1AP signalling cannot be used for the initial configuration of the adaptation layer entity. Some example embodiments of the invention provide solutions for initial configuration (auto configuration) of the IAB node adaptation layer, especially for the IAB-node address allocation. IAB-node address is needed already for the F1-C setup.

When IAB-node connects to network (i.e. to its parent node: DgNB or intermediate IAB node), the MT-part connects first as normal UE, authenticates itself and sets up RRC connection. With RRC connection, a default backhaul (BH) RLC channel may be configured between the parent node and the IAB-node MT-part.

F1AP is assumed to configure/update the routing tables. When a new IAB-node connects, it does not originally have an IAB-node address. IAB-donor CU (CU of DgNB) can allocate that address and, with F1AP signalling, update the address into the routing tables in the existing IAB-nodes and IAB-donor DU (DU of DgNB). Some embodiments of this invention describe how to get that address to the new IAB node itself where F1 connection is not yet setup.

According to some example embodiments of the invention, a first DL adapt layer packet (data or control) is sent to the new IAB node and includes the address of the new node in the adaptation layer header. Since the new IAB node is initially connected to a single parent node and does not yet forward any packets to any other nodes or access UEs, the new IAB node knows that the address included in the packet is its own address and may take that address into use. Optionally, the adaptation layer header may contain a dedicated flag (e.g. one bit), indicating that the header shall be used for adaptation layer address configuration.

If there is no data or control packet to be sent to the IAB node in the DL direction, an adaptation layer control PDU or a dummy adaptation layer data PDU may be sent to the IAB node with the IAB node address included (normally) in the header of the adaptation layer PDU.

In some example embodiments of the invention, a path identifier or route identifier may be used instead of the destination address as adaptation layer address. According to such example embodiments of the invention, a new IAB node gets its first path identifier in the same way as the destination address, as described above. Some example embodiments of the invention are related to any identifier placed in BAP protocol header and used for routing of packets of the adaptation layer.

If IAB node first sends an UL packet and does not know the UL destination address of the IAB-donor DU, according to some example embodiments of the invention, IAB-node may use an "unspecified" destination address in the adaptation layer of the UL packets and send the packet to its parent node. If the parent node is an intermediate IAB node, the parent node may add IAB-donor DU address to the packet (i.e., replace the "unspecified" address), or may forward the packet as such (each node is assumed to know its parent). In some example embodiments, the parent node may send a packet comprising the identification of the new IAB node (e.g. an adaptation layer/BAP control PDU with the IAB-donor DU destination address) after having received the UL packet. In particular, the parent node may respond to the unspecified destination address by a packet comprising the identification of the new IAB node.

If first packet between IAB node and IAB-donor DU is sent in DL direction, then IAB-donor DU may include its own address in the packet in addition to the assigned address of IAB node.

The adaptation layer header may contain both the source and the destination address. In that case, the first UL packet (before any DL packet) may set both addresses unspecified and the response packet comprises both addresses (identifiers).

If path identifier is used in the adapt header, then the first UL packet (before any DL packet) may use unspecified path id and get the UL and DL path id from the first received DL packet.

Figure 4:
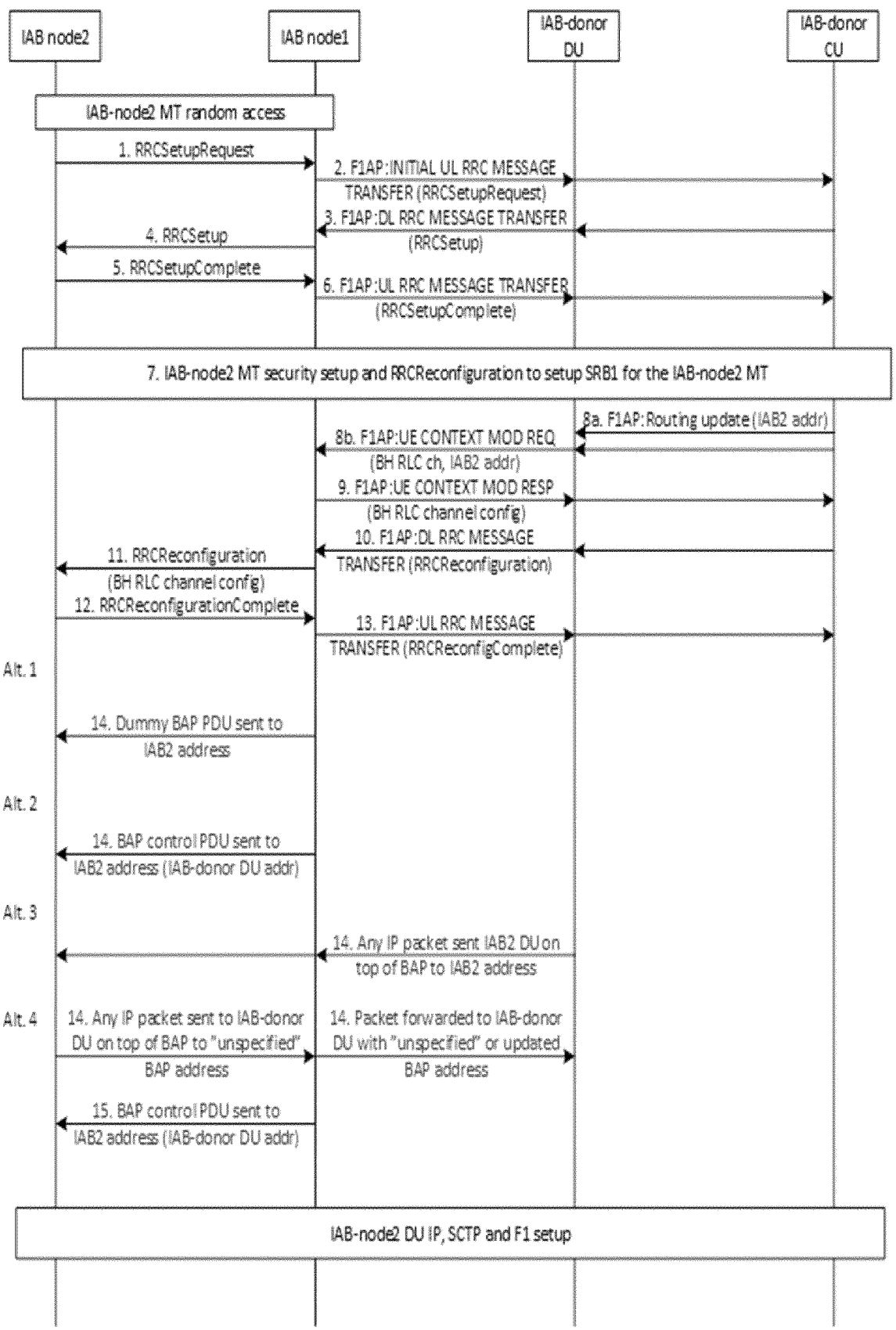
FIG. 4 shows a signalling diagram according to some example embodiments of the invention.

FIG. 4 shows a signalling diagram according to some example embodiments of the invention. In this example, IAB-Node 2 is added to the tree of IAB donor (DgNB comprising CU and DU) and IAB node 1. However, the number of intermediate nodes (such as IAB node 1) is arbitrary. In some example embodiments, an intermediate node may not be present and the new IAB node is directly connected to the DgNB.

The signalling of FIG. 4 includes the setup of RRC and RLC and the providing the BAP address to a new IAB-node (IAB-node 2) connecting to a parent node (IAB-donor DU or IAB-node DU). Steps 1-13 are known and similar to the steps of UE initial access. Step 8 includes updates of routing tables to BAP entities: either a new F1AP message may be used for that or some existing F1AP message may be updated. In FIG. 4, as an example, step 8a shows a new message, and step 8b reuses an existing updated message. In both cases the BAP entity is provided with the BAP layer address of the new IAB-node (IAB-node2) and routing instructions, i.e., the next hop to be used for that address. Once the routing tables in the IAB-donor DU and all the IAB-nodes along the path to the new IAB-node have been updated, BAP/adapt packets can be routed to the new IAB-node.

Four example embodiments are shown in FIG. 4 with the same steps 1 to 13 but a different step 14 (and step 15, if any).

In the first example embodiment (Alt. 1), the parent node of the new IAB-node 2 (IAB-node 1 in this example) sends a dummy BAP PDU to the new IAB-node 2 and includes the new BAP layer address in the BAP PDU header (like a routing address in any BAP PDU).

In the second example embodiment (Alt. 2), the parent node sends a new BAP control PDU to the new IAB node 2, The BAP control PDU carries the BAP address in its header and/or payload. The advantage of this approach is that, in some example embodiments, also the IAB-donor DU address may be included in the control PDU. A BAP control packet may be distinguished from other BAP packets by a predefined indication in its header.

For the both above embodiments (Alt. 1 and Alt. 2), the sending of the BAP PDU can also be initiated by the IAB-donor DU, not only by the parent node.

If the control packet comprises the BAP address of the new IAB node in its payload, the control packet may be a one-hop packet from the parent node to the new IAB node. Such a one-hop packet may be designated by a particular (predefined) indication in its header. The receiver of a one-hop node (here: the new IAB node) knows that the one-hop packet is intended for it and does not route the one-hop packet to any other node. Thus, a one-hop packet may not comprise any destination address in the packet header, or it may comprise a destination address of arbitrary value because the receiver ignores the content of the destination address.

There may be different predefined indications for (general) control packets, (general) one-hop packets, and one-hop control packets. Alternatively, a header of a one-hop control packet may comprise both a control packet indication and a one-hop packet indication.

In a third example embodiment (Alt. 3), BAP address of the new IAB-node can be read from the BAP header of the BAP packet carrying a higher layer packet (typically IP packet) as a payload, wherein the BAP packet is sent to the IAB-node DU. The higher layer packet may be, e.g., an ICMPv6 Router Advertisement (RA) packet. The higher layer packet may carry the BAP address of the new IAB-node in its payload. Alternatively or in addition, the header of the BAP packet may comprise the BAP address of the new IAB node.

In a fourth embodiment (Alt. 4), the new IAB-node2 sends first a higher layer packet (typically an IP packet (e.g., ICMPv6 Solicitation or DHCP request)) included in a BAP PDU or a BAP packet (e.g. a dummy BAP PDU (without a payload) or a BAP control PDU) and uses as destination address an "unspecified" BAP address. When the parent node receives that packet, it can either forward it as is, i.e., with "unspecified" destination address, or it can update the IAB-donor DU address to it. In response to the first received UL packet either the parent node or the IAB-donor DU may respond to that by using a message according to one of example embodiments 1, 2 or 3 above. I.e., it may send a dummy BAP PDU or BAP control PDU or wait until the response packet to the first IP packet is ready and send that to the new IAB-node.

As explained above, each of example embodiments 1, 2, and 3 may be applied alone or in combination with example embodiment 4, according to which the packet comprising the BAP address of the new IAB node is provided after receipt of the first UL packet from the new IAB node (preferably in response to the first UL packet).

In case the dedicated flag indicating that the header shall be used for adaptation layer address configuration is included in the first PDU to the IAB node or an adaptation layer control PDU is used for delivery of the route identifier or destination address, this PDU may also be used to provide more than one identifiers/addresses to the IAB node. In case multiple destination addresses or route identifiers may be provided and assigned to the IAB node, a separate flag may indicate that a certain identifier/address is to be de-configured. In case only a single destination address/route identifier is allowed, IAB node may overwrite its previous destination address/route identifier when a new one is provided.

Figure 6:
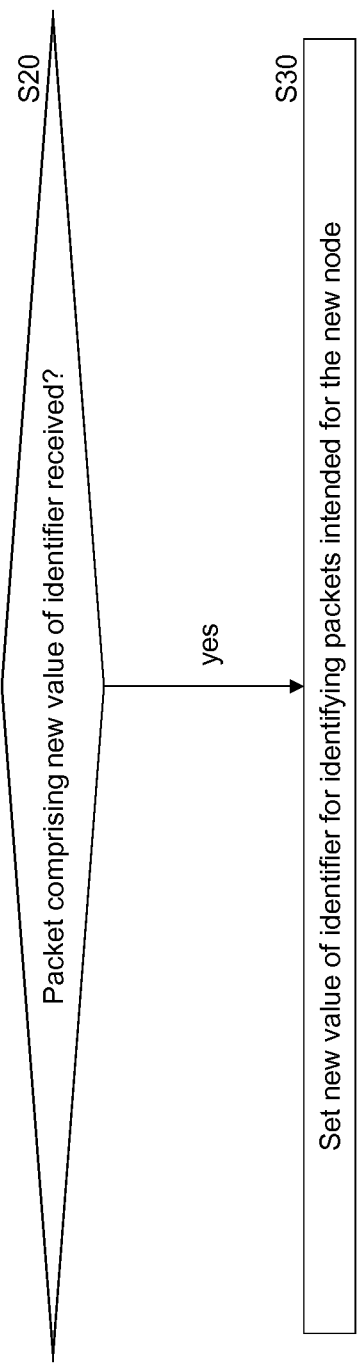
FIG. 6 shows a method according to an example embodiment of the invention.
Figure 5:
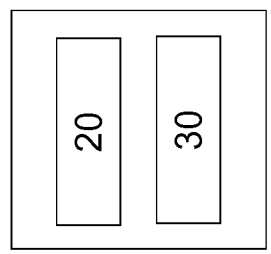
FIG. 5 shows an apparatus according to an example embodiment of the invention.

FIG. 5 shows an apparatus according to an example embodiment of the invention. The apparatus may be an IAB node (e.g. an IAB node newly added to a tree) or an element thereof. FIG. 6 shows a method according to an example embodiment of the invention. The apparatus according to FIG. 5 may perform the method of FIG. 6 but is not limited to this method. The method of FIG. 6 may be performed by the apparatus of FIG. 5 but is not limited to being performed by this apparatus.

The apparatus comprises means for monitoring 20 and means for setting 30. The means for monitoring 20 and means for setting 30 may be a monitoring means and setting means, respectively. The means for monitoring 20 and means for setting 30 may be a monitor and setter, respectively. The means for means for monitoring 20 and means for setting 30 may be a monitoring processor and setting processor, respectively.

The means for monitoring 20 monitors if an assignment packet is received by a new node from a parent node (S20). The assignment packet comprises a new value of an identifier. The assignment packet is a packet of the first layer protocol. The assignment packet comprises a header of the first layer protocol. In particular, the format of the header of the assignment packet may be the same as the format of any other packet of the first layer protocol, or, in some example embodiments, it may comprise an additional indication to indicate that the packet is an assignment packet. The new value of the identifier is for determining if a first packet of a first layer protocol is intended for the new node If the assignment packet is received (S20=yes), the means for setting 30 sets the new value of the identifier (S30).

Figure 8:
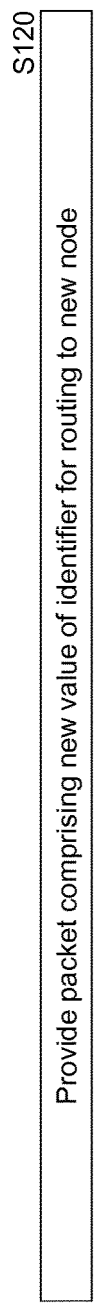
FIG. 8 shows a method according to an example embodiment of the invention.
Figure 7:
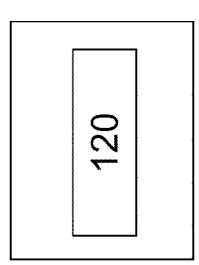
FIG. 7 shows an apparatus according to an example embodiment of the invention.

FIG. 7 shows an apparatus according to an example embodiment of the invention. The apparatus may be an IAB node (e.g. an IAB parent node) or an element thereof or a DgNB or an element thereof (such as a DU or an element thereof). FIG. 8 shows a method according to an example embodiment of the invention. The apparatus according to FIG. 7 may perform the method of FIG. 8 but is not limited to this method. The method of FIG. 8 may be performed by the apparatus of FIG. 7 but is not limited to being performed by this apparatus.

The apparatus comprises means for instructing 120. The means for instructing 120 may be a instructing means. The means for instructing 120 may be an instructor. The means for instructing 120 may be an instructing processor.

The means for instructing 120 instructs a parent node to provide an assignment packet to a new node (S120). The assignment packet comprises a new value of an identifier. The assignment packet is a packet of a first layer protocol. The assignment packet comprises a header of the first layer protocol. In particular, the format of the header of the assignment packet may be the same as the format of any other packet of the first layer protocol, or, in some example embodiments, it may comprise an additional indication to indicate that the packet is an assignment packet. The new value of the identifier is for routing a first packet of the first layer protocol to the new node.

Figure 9:
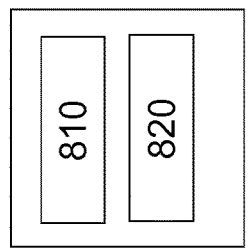
FIG. 9 shows an apparatus according to an example embodiment of the invention.

FIG. 9 shows an apparatus according to an example embodiment of the invention. The apparatus comprises at least one processor 810 and at least one memory 820 including computer program code, and the at least one processor 810, with the at least one memory 820 and the computer program code, being arranged to cause the apparatus to at least perform at least one of the methods according to FIGS. 6 and 8 and related description.

Some embodiments of the invention are described in detail with respect to BAP. However, the invention is not restricted to BAP. It may be applied to any protocol if the lower layer(s) ensure that the newly added node is connected to at least one parent node providing the address of the protocol to the newly added node. In the examples described above, the DgNB or, if there are intermediate IAB nodes in the chain from the DgNB to the newly added IAB node, any intermediate node and in particular the last intermediate IAB node (i.e. the IAB node last in the chain from DgNB to the newly added IAB node) may be the parent node.

According to the current BAP protocol, the header comprises a destination address but does not comprise a source address. If the header of the BAP protocol comprises both a destination address and a source address, any of these addresses or both of them may comprise the new identifier but typically, the destination address will comprise the new identifier. The new identifier may identify the new node or a path from/to the new node such that the new node can distinguish packets directed to the new node from other packets. In addition, the new node may use the new identifier as a source address if it sends a packet of the BAP protocol.

Some example embodiments of the invention are described which are based on a 3GPP network. However, the invention is not limited to 3GPP networks of any generation (3G, 4G, 5G, etc.). It may be applied to other wireless networks applying layer 2 relaying, too. The definitions indicated in the present description are based on the current 3GPP standards. However, they do not limit the invention. Other definitions according to the same or a corresponding concept are applicable to some example embodiments of the invention, too.

One piece of information may be transmitted in one or plural messages from one entity to another entity. Each of these messages may comprise further (different) pieces of information.

Names of network elements, protocols, and methods are based on current standards. In other versions or other technologies, the names of these network elements and/or protocols and/or methods may be different, as long as they provide a corresponding functionality.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software. Each of the entities described in the present description may be embodied in the cloud.

According to the above description, it should thus be apparent that example embodiments of the present invention provide, for example, an IAB node, or a component thereof, an apparatus embodying the same, a method for controlling and/or operating the same, and computer program(s) controlling and/or operating the same as well as mediums carrying such computer program(s) and forming computer program product(s). According to the above description, it should thus be apparent that example embodiments of the present invention provide, for example, a base station such as a donor base station (e.g. a donor gNB or donor eNB), or a component thereof, an apparatus embodying the same, a method for controlling and/or operating the same, and computer program(s) controlling and/or operating the same as well as mediums carrying such computer program(s) and forming computer program product(s).

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof.

It is to be understood that what is described above is what is presently considered the preferred example embodiments of the present invention. However, it should be noted that the description of the preferred example embodiments is given by way of example only and that various modifications may be made without departing from the scope of the invention as defined by the appended claims.

The invention claimed is:

1. An apparatus, comprising:
at least one processor; and
at least one non-transitory memory storing instructions, that when executed by the at least one processor, cause the apparatus at least to:
monitor if an assignment packet is received by a new node from a parent node;
set, when the assignment packet is received, a new value of an identifier for determining if a first packet of a first layer protocol is intended for the new node,
wherein the assignment packet comprises the new value of the identifier,
wherein the header of the assignment packet comprises the new value of the identifier,
wherein the assignment packet is a packet of the first layer protocol,
wherein the assignment packet comprises a header of the first layer protocol,
wherein the header includes a dedicated one bit flag, indicating that the header shall be used for adaptation layer address configuration,
wherein the assignment packet comprises as payload a second layer protocol data unit,
wherein the second layer protocol is on top of the first layer protocol, and
wherein a payload of the second layer protocol data unit comprises the new value of the identifier;
supervise if any value of the identifier is set, wherein the new value of the identifier is set only if any value of the identifier is not set; and
check if a connection according to a base layer protocol between the parent node and the new node is configured,
wherein the first layer protocol is directly on top of the base layer protocol,
wherein the earliest packet of the first layer protocol received by the new node after the connection according to the base layer protocol between the parent node and the new node is configured is identified as the assignment packet,
wherein only the earliest packet received by the new node after the connection according to the base layer protocol between the parent node and the new node is configured is identified as the assignment packet,
wherein the base layer protocol is a radio link control protocol.

* * * * *